United States Patent
Halvani et al.

(10) Patent No.: US 11,693,145 B1
(45) Date of Patent: Jul. 4, 2023

(54) AIRBORNE SENSOR FOR UNDERGROUND OBJECT DETECTION

(71) Applicant: Exodigo Ltd., Tel Aviv (IL)

(72) Inventors: Oriel Halvani, Kiryat Ono (IL); Tal Esh, Tel Aviv (IL); Guy Inbar, Tel Aviv (IL)

(73) Assignee: Exodigo Ltd., Tel Aviv (IL)

(*) Notice: Subject to any disclaimer, the term of this patent is extended or adjusted under 35 U.S.C. 154(b) by 0 days.

(21) Appl. No.: 17/958,466

(22) Filed: Oct. 3, 2022

(51) Int. Cl.
*G01V 3/165* (2006.01)
*B64D 47/00* (2006.01)
*B64D 1/22* (2006.01)
*B64C 39/02* (2023.01)

(52) U.S. Cl.
CPC ............ *G01V 3/165* (2013.01); *B64C 39/024* (2013.01); *B64D 1/22* (2013.01); *B64D 47/00* (2013.01)

(58) Field of Classification Search
CPC ........ G01V 3/16; G01V 3/165; B64C 39/024; B64D 1/22; B64D 47/00
See application file for complete search history.

(56) References Cited

U.S. PATENT DOCUMENTS

| | | | |
|---|---|---|---|
| 9,162,753 B1 | 10/2015 | Panto | |
| 10,317,559 B1 | 6/2019 | Olsson | |
| 10,882,595 B2 | 1/2021 | Allcorn et al. | |
| 2009/0284258 A1* | 11/2009 | Morrison | G01V 3/16 244/30 |
| 2010/0244843 A1* | 9/2010 | Kuzmin | G01V 3/165 324/345 |
| 2014/0084930 A1* | 3/2014 | Dodds | G01V 3/165 324/331 |
| 2016/0061984 A1* | 3/2016 | Partner | G01V 3/165 324/330 |
| 2016/0178782 A1* | 6/2016 | Miles | G01V 3/165 324/339 |
| 2016/0231449 A1* | 8/2016 | Miles | G01V 3/16 |
| 2017/0307670 A1 | 10/2017 | Olsson | |
| 2018/0044019 A1* | 2/2018 | Morrison | G01V 3/165 |
| 2021/0396905 A1* | 12/2021 | Neill | G06N 3/006 |

* cited by examiner

Primary Examiner — Jermele M Hollington
Assistant Examiner — Suresh K Rajaputra

(57) ABSTRACT

An aerial detection system includes an aerial vehicle unit and a hanging platform mechanically connected to an aerial vehicle by at least one flexible link. An EM sensor and hanging platform circuitry are mounted on the hanging platform. The hanging platform circuitry processes the EM sensor output signals. The aerial vehicle unit is attached the aerial vehicle and includes AVU circuitry which processes signals output by the hanging platform circuitry. The hanging platform circuitry and AVU circuitry are connected by one or more wired and/or wireless signal connections.

24 Claims, 13 Drawing Sheets

AIRBORNE SENSOR FOR UNDERGROUND OBJECT DETECTION

FIELD AND BACKGROUND OF THE INVENTION

The present invention, in some embodiments thereof, relates to detecting buried objects such as underground utilities and, more particularly, but not exclusively, to detecting underground utilities using an airborne sensor.

There are many situations where it is desirable to locate buried utilities such as pipes and cables. For example, prior to starting new construction that involves excavation, it is important to locate existing underground utilities such as underground power lines, gas lines, phone lines, fiber optic cable conduits, water pipes and sewer pipes, etc. If excavation equipment hits an underground utility, serious injury and property damage may result.

Various techniques have been developed to locate and map underground utilities and other manmade subsurface structures. Present utility mapping practices take two basic forms: systems that must have some type of connection to the utility at some accessible point along its path and systems that attempt to map utilities independent of any connection or even prior knowledge of their existence.

Systems that connect to the utility are problematic for many reasons, including the difficulty and cost of physically accessing the utility and a limited ability to sense non-conductive utilities.

Some systems currently in use employ ground penetrating radar (GPR). GPR surveys determine the location and relative depth of potential utilities from an analysis of reflected energy. GPR-based systems for utility detection are very heavy and are only able to recognize relatively big interferences and are usually restricted to depths of no more than three meters. Furthermore, the use of GPR systems for utility detection is very restricted around the world due to it being a transmitting component.

Some GPR-based systems are portable self-standing devices. However these systems are moved manually over the surface, making them impractical for covering large areas. Other GPR-based systems are carried by an aerial vehicle (e.g. drone). However the aerial vehicle must fly at very specific heights and maintaining these heights is extremely difficult with a heavy system. Additionally, elevating the sensor from the ground causes a major decrease in signal penetration, while the surface absorbs most of the energy. A further issue is that in many places the height the GPR drone can fly at is limited to around one meter due to the heavily regulated frequency in which the GPR operates.

Magnetic sensors are also used for underground utility detection, for example the MagArrow by Geometrics. The magnetic sensor is carried by an aerial vehicle and is used to scan large areas for magnetic anomalies which may indicate underground utilities. However the magnetic sensor is extremely sensitive to outside noise and prone to interference. This renders it unsuitable for scanning for underground utilities in urban areas. Additionally, some utilities, such as communication cables, cannot be easily identified by detecting magnetic anomalies.

SUMMARY OF THE INVENTION

It is an object of the present disclosure to describe a system for sensing underground objects using a sensor hanging from an aerial vehicle and a method for assembly of the system for sensing underground objects. Some aspects of the system include data collection for detection of buried objects (such as underground utilities) by an EM sensor suspended from an aerial vehicle. In some embodiments the system performs preliminary processing of the collected data and further processing is performed off-line to map the underground utilities.

According to a first aspect of some embodiments of the present invention there is provided a system which includes a hanging platform, at least one flexible link and an aerial vehicle unit. The hanging platform is adapted to be mechanically connected to an aerial vehicle by at least one flexible link and has mounted upon it:

an electromagnetic (EM) sensor configured to output at least one analog signal
indicative of electromagnetic field (EMF) radiation captured by the EM sensor; and
a first circuitry for performing at least analog signal processing on an output of
the EM sensor and outputting the processed EM sensor signal(s).

The aerial vehicle unit is adapted to be attached to the aerial vehicle, and includes a second circuitry for performing at least digital signal processing of the processed EM sensor signal(s) and for outputting a result of the digital signal processing.

According to some embodiments of the invention, the first circuitry and the second circuitry are connected by at least one wireless connection.

According to some embodiments of the invention, the first circuitry and the second circuitry are connected by at least one wired connection.

According to some embodiments of the invention, the second circuitry is connected to a circuitry of the aerial vehicle.

According to some embodiments of the invention, the EM sensor includes a passive probe.

According to some embodiments of the invention, the EM sensor includes multiple passive probes configured to sense the electromagnetic field along respective axes and multiple signal amplifiers configured for amplifying respective analog outputs of the plurality of passive probes.

According to further embodiments of the invention, the passive probe(s) are high-permeability core antenna(s).

According to some embodiments of the invention, the EM sensor includes an active probe.

According to further embodiments of the invention, the second circuitry includes:

an analog to digital converter configured to digitize at least one analog signal input from the first circuitry; and
at least one digital processor configured to perform the digital signal processing.

According to further embodiments of the invention, the second circuitry includes at least one of:

a memory configured for storing results of the processing and EM sensor location data; and
a transmitter configured to transmit results of the processing over a wireless communication link.

According to further embodiments of the invention, the first circuitry includes a global navigation satellite system (GNSS) antenna configured to receive GNSS signals and the second circuitry includes a GNSS receiver connected to an output of the GNSS antenna.

According to a second aspect of some embodiments of the present invention there is provided a method of assembling a system for electromagnetic surveying. The method includes:

providing a hanging platform having mounted thereon an electromagnetic (EM) sensor configured to capture electromagnetic field (EMF) radiation and a first circuitry configured to perform at least analog signal processing on an output of the EM sensor;

providing an aerial vehicle unit configured to be attached to an aerial vehicle which includes a second circuitry. The second circuitry is configured to perform at least digital signal processing of an output of the first circuitry and to output a result of the digital signal processing;

mechanically connecting the hanging platform to an aerial vehicle by at least one flexible link; and connecting one or more outputs of the first circuitry to one or more inputs of the second circuitry.

According to further embodiments of the invention, the output of the first circuitry and the input of the second circuitry are configured for connection by wireless communication.

According to further embodiments of the invention, the method further includes connecting the output of the first circuitry and the input of the second circuitry by at least one wired connection.

According to further embodiments of the invention, the method further includes connecting the second circuitry to a circuitry of the aerial vehicle.

According to further embodiments of the invention, the first circuitry further includes a global navigation satellite system (GNSS) antenna configured to receive GNSS signals.

According to further embodiments of the invention, the EM sensor includes a passive probe configured for sensing the EMF radiation.

According to further embodiments of the invention, the EM sensor includes a multiple passive probes configured to sense the EMF radiation along respective axes, and the method further includes connecting analog outputs of the passive probes to respective analog inputs of signal amplifiers in the first circuitry.

According to further embodiments of the invention, the method further includes connecting the second circuitry to at least one of:

a transmitter configured to transmit results of the processing over a wireless communication link; and a memory configured to store results of the processing.

According to a third aspect of some embodiments of the present invention there is provided a system which includes at least one rigid mechanical link, a hanging platform and an aerial vehicle unit. The hanging platform is adapted to be mechanically connected to an aerial vehicle by at least one rigid mechanical link and has mounted upon it:

an electromagnetic (EM) sensor configured to output at least one analog signal indicative of electromagnetic field (EMF) radiation captured by the EM sensor; and a first circuitry configured for performing at least analog signal processing on an output of the EM sensor and outputting the processed EM sensor signal(s); and The aerial vehicle unit is adapted to be attached to the aerial vehicle, and includes a second circuitry configured to perform at least digital signal processing of processed EM signal(s) and to output a result of the digital signal processing.

According to some embodiments of the invention, the first circuitry and the second circuitry are connected by at least one wireless connection.

According to some embodiments of the invention, wherein the first circuitry and the second circuitry are connected by at least one wired connection.

According to some embodiments of the invention, the EM sensor includes multiple passive probes and the first circuitry includes multiple signal amplifiers connected to respective outputs of the passive probes, and the second circuitry includes an analog to digital converter configured to digitize respective output signals from the signal amplifiers and a digital processor configured to process the digitized signals.

According to some embodiments of the invention, the first circuitry includes a global navigation satellite system (GNSS) antenna configured to receive GNSS signals and the second circuitry includes a GNSS receiver connected to an output of the GNSS antenna by one of a wired connection and a wireless connection.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1A:
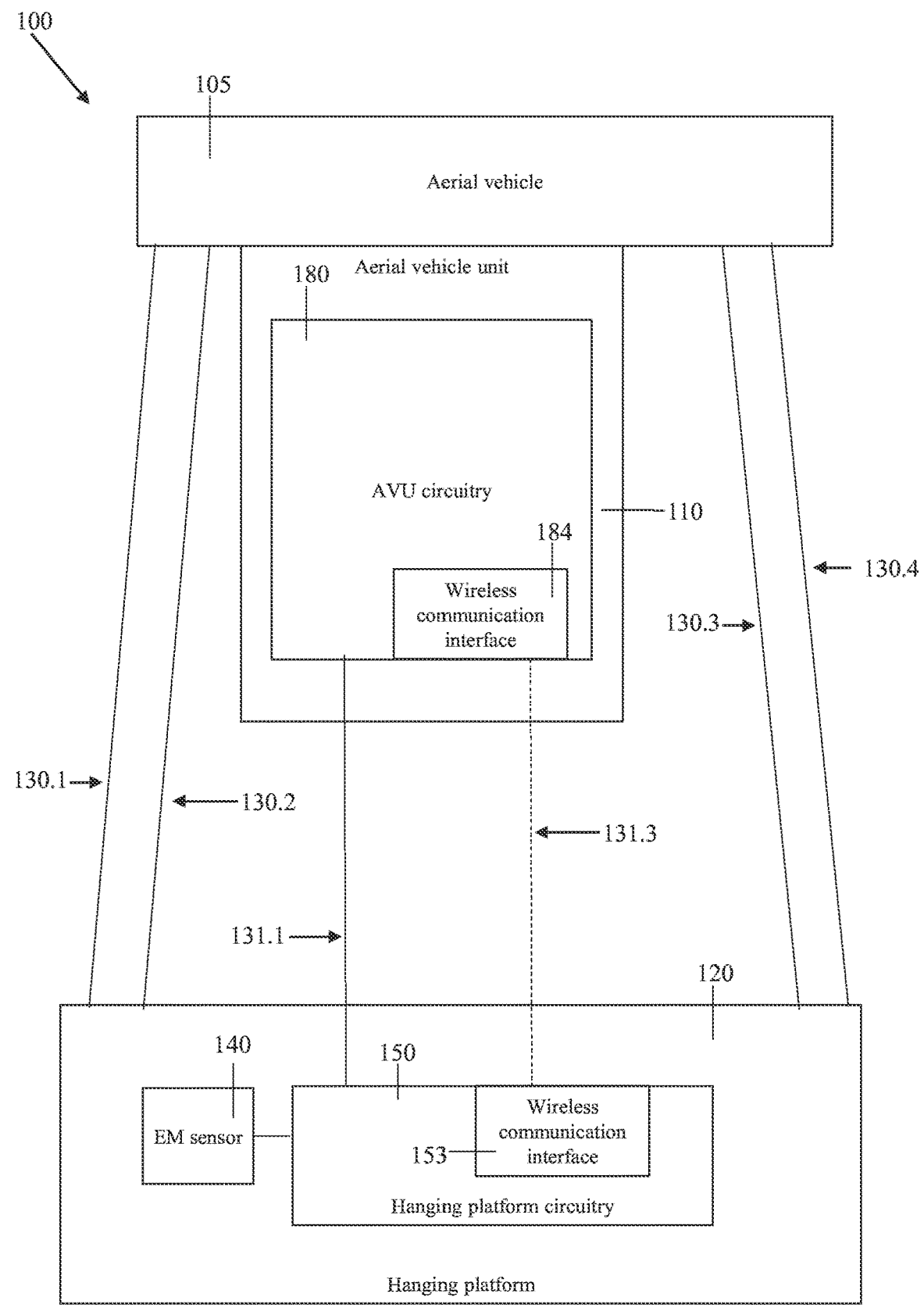
FIGS. 1A, 1B, 1C and 1D are simplified block diagrams of aerial detection systems for detecting electromagnetic field radiation, according to respective embodiments of the invention.

The present invention, in some embodiments thereof, relates to detecting buried objects such as underground utilities and, more particularly, but not exclusively, to detecting underground utilities using an airborne sensor.

Embodiments of the invention collect data which is analyzed to map underground anomalies such as buried utilities by sensing an emitted or induced electromagnetic signal. For example, some buried cables, such as electric power lines, are themselves energized and emit a long cylindrical electromagnetic field. In a second case, the buried utility is not energized (e.g. water pipes) and the electromagnetic signal is induced by a transmitter transmitting in the vicinity of the buried utility.

Embodiments of the system described herein (denoted herein the aerial detection system) use an electromagnetic (EM) sensor to capture electromagnetic field (EMF) radiation that may indicate the presence of underground utilities or other underground anomalies. The EM sensor is mounted on a hanging platform that is connected to an aerial vehicle. Thus the aerial vehicle may transport the EM sensor in a search pattern over a large geographic area and EM sensor data may be collected efficiently over the entire area. The collected EM sensor information may be analyzed to identify and map underground utilities over the entire area.

In some embodiments, the aerial detection system performs limited processing of the EM sensor signal, for example just storing and/or transmitting digitized sensor data. Additional processing to locate and map underground utilities may be performed by post-processing at a ground station.

The aerial detection systems described herein provides a technical solution to the technical problem of detecting low level EMF radiation emitted by and/or induced in underground utilities. The problem is particularly acute with EM sensors that are capable of detecting radiation from a large number of sources. In order to detect the EMF emitted from a buried infrastructure the EM sensors should be highly sensitive. Such highly sensitive EM sensors are unable to provide accurate signals when operating in an electromagnetically noisy environment such as the vicinity of a drone.

The technical solution presented herein is to mount the EM sensors, and optionally other circuitry (denoted herein hanging platform circuitry), on a hanging platform designed to hang from an aerial vehicle during flight. Other electronic components of the aerial detection system (denoted herein AVU circuitry) are within an aerial vehicle unit (AVU). The aerial vehicle is attached to the aerial vehicle by mechanical links. The mechanical links distance the EM sensor from the electromagnetically noisy vicinity of the aerial vehicle. The EM sensor and/or hanging platform circuitry are connected to the AVU circuitry by one or more wired and/or wireless signal connections.

In some embodiments of the invention the mechanical links are flexible and are capable of bending repeatedly. These links are denoted herein "flexible links". In alternate embodiments of the invention, one, some or all of the mechanical links are rigid (denoted herein "rigid links") and are capable of bending only slightly.

In this way the EM sensors may be transported by the aerial vehicle while being distanced from the noisy environment surrounding the aerial vehicle. This distance reduces the noise in the vicinity of the EM sensor dramatically, thereby improving the accuracy of the EM sensor outputs. The EM sensor output signals may be processed to make a highly accurate model of underground phenomena in the scanned area. The system may be precisely geo-located at all times using GNSS.

Examples of utilities that may be detected by analysis of EM sensor data include but are not limited to:
a) Electric cables
b) Telecommunication cables;
c) Data cables;
d) Water and sewer pipelines;
e) Gas and oil pipelines; and
f) Fiber optic cables.

Benefits of the invention include:
1) EM sensors are light and may be transported by a small, low cost aerial vehicle capable of carrying small payloads of, for example, up to 6 kilograms.
2) The system is capable of collecting data in urban and other complex areas due to the high maneuverability of small aerial vehicles relative to the larger aerial vehicles required to transport heavier sensors;
3) The highly sensitive EM sensors provide high accuracy measurements which are made in a non-intrusive manner without penetrating the ground at any point;
4) The system is capable of detecting anomalies caused by any material that affects the electromagnetic field;
5) Large geographical areas may be scanned in a single pass due to the low weight of the EM sensors; and
6) The system is not sensitive to the terrain, and is not impeded by the presence of objects such as boulders, quicksand or thorny vegetation.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

I) Aerial Detection System

Referring now to the drawings, FIG. 1A is a schematic block diagram of an aerial detection system for detecting electromagnetic field radiation, according to an exemplary embodiment of the invention. Aerial detection system 100 includes aerial vehicle unit 110, hanging platform 120, flexible links 130.1-130.4 and signal connections 131.1 and 131.3. Signal connection 131.1 is a wired connection and signal connection 131.3 is a wireless connection. A wired connection may include multiple electrical wires and/or cables.

Figure 1B:
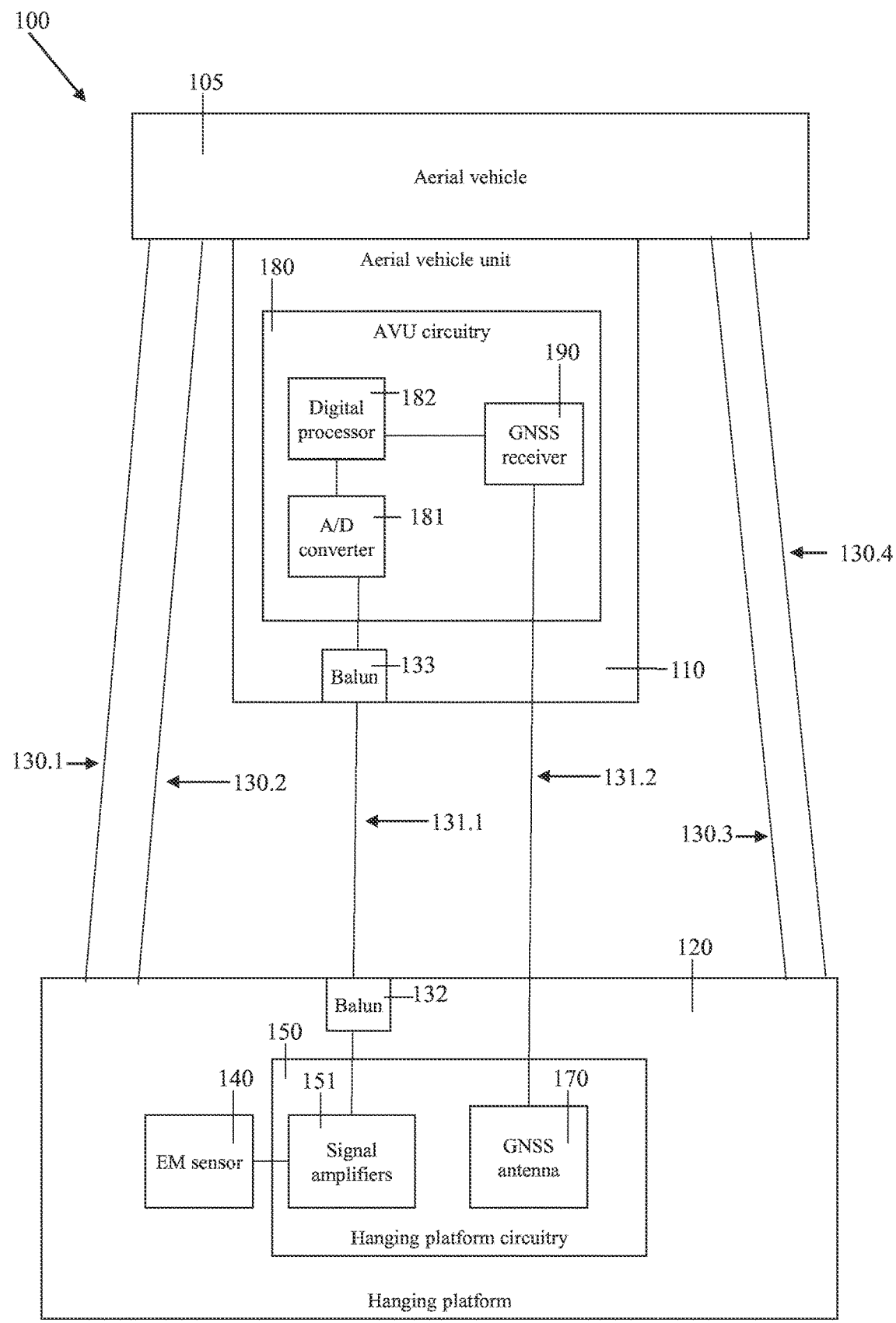
Figure 1C:
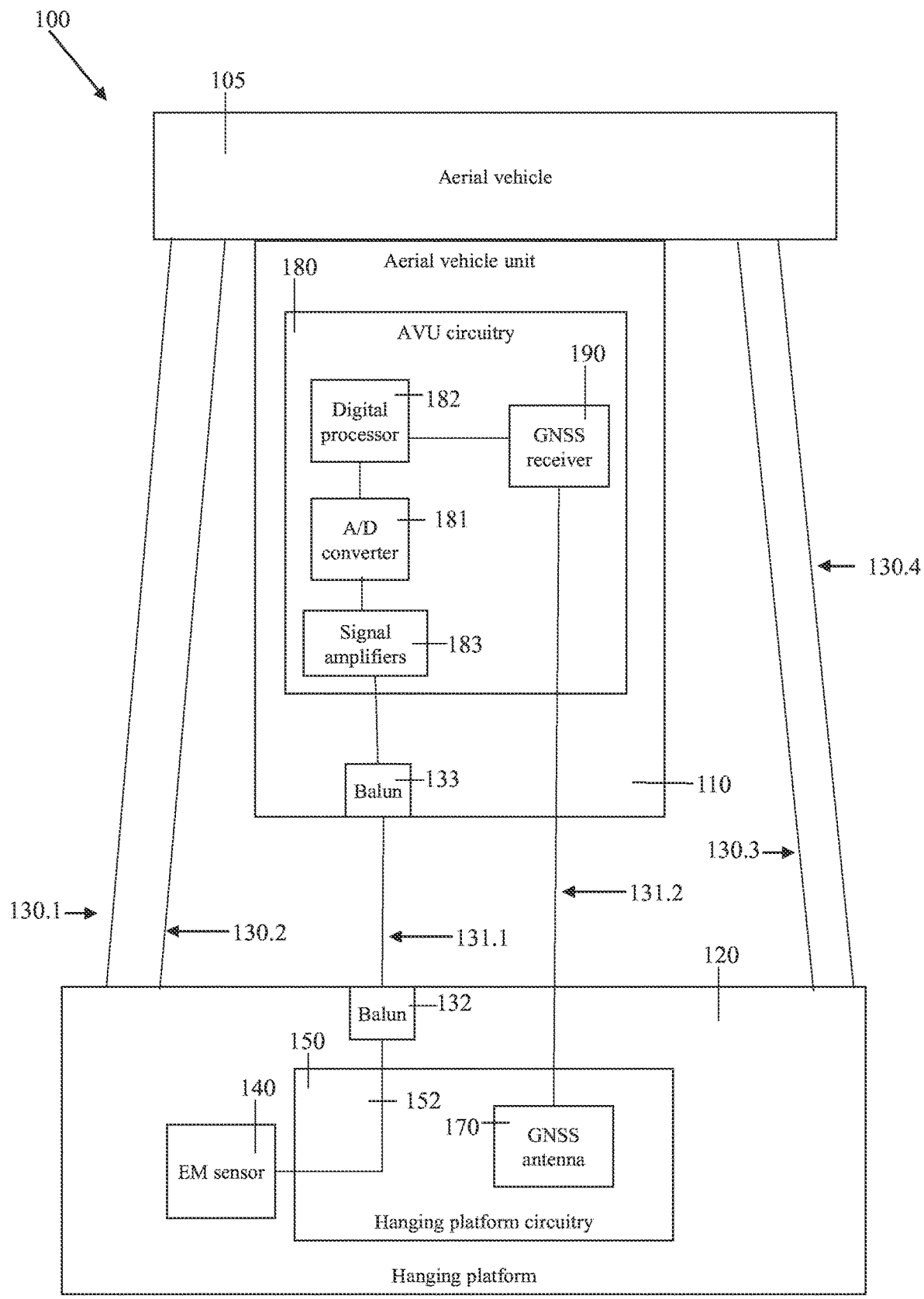
Figure 1D:
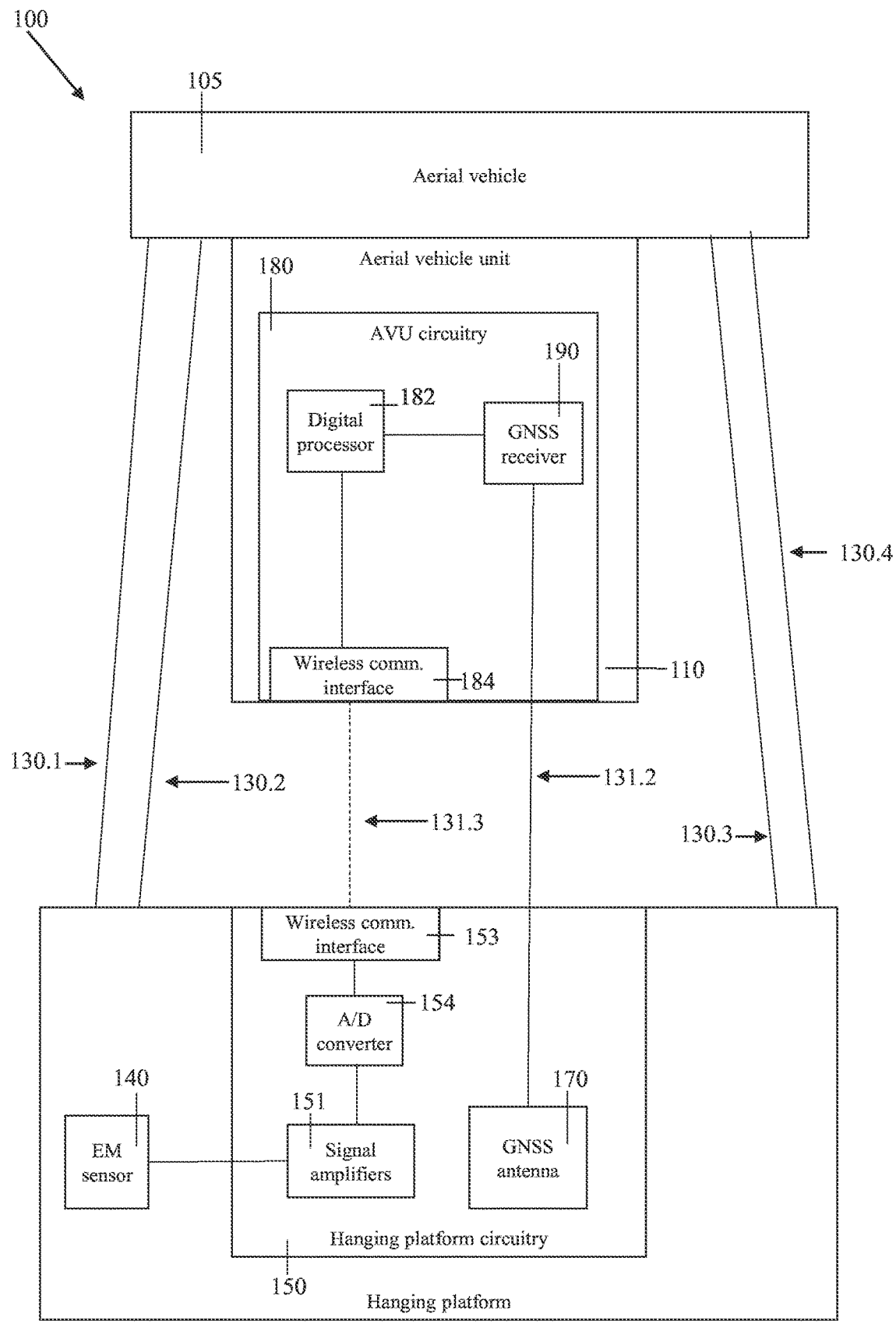

As will be appreciated, the number of flexible links, wired connections and/or wireless connections may be different, in accordance with the particular embodiment. Exemplary embodiments of hanging platform circuitry 150 and AVU circuitry 180 are illustrated in FIGS. 1B-1D.

EM sensor 140 and hanging platform circuitry 150 are mounted on hanging platform 120. Hanging platform circuitry 150 performs analog signal processing on the output of EM sensor 140. Optionally, hanging platform circuitry 150 performs additional signal processing which may include but is not limited to:
1) A/D conversion of the processed analog signals; and
2) Digital processing of the digitized signals.

Signal connections 131.1 and 131.3 connect outputs of hanging platform circuitry 150 to inputs of AVU circuitry 180.

AVU 110 includes AVU circuitry 180 which performs digital signal processing on signals input from hanging platform circuitry 150. When one or more signals input from hanging platform circuitry 150 are analog signals, AVU circuitry includes an A/D converter which digitizes the analog signal(s) before digital processing is performed.

Optionally, AVU circuitry 180 performs additional signal processing which may include, but is not limited to, analog signal processing of analog input signals from hanging platform circuitry 150, prior to A/D conversion.

Flexible links 130.1-130.4 connect hanging platform 120 to aerial vehicle 105 mechanically, so that hanging platform 120 is tethered to aerial vehicle 105. During data collection, hanging platform 120 hangs from aerial vehicle 105. As the aerial vehicle flies, hanging platform 120 is towed along the desired route or pattern. The EM sensor readings are conveyed via hanging platform circuitry 150 to AVU circuitry 180 for processing. The results of the AVU circuitry processing may be transmitted to a ground station and/or stored in a memory in AVU 110.

As used herein the term "aerial vehicle" means an unmanned aerial vehicle (UAV) capable of traversing a geographical area at an altitude low enough to enable an EM sensor to detect EMF radiation emitted from underground.

As used herein the term "flexible link" means a flexible physical object used to mechanically connect two physical components of the aerial detection system.

As used herein the term "rigid link" means a physical object with slight or no flexibility used to mechanically connect two physical components of the aerial detection system.

As used herein the terms "mechanically connects" and "mechanically connected" means a weight-bearing connection that enables the aerial vehicle to suspend the hanging platform by the flexible link during flight.

As used herein the terms "signal connection" means a connection that transfers an analog and/or digital signal between the hanging platform and the aerial vehicle unit. Unless explicitly specified, a signal connection may be a wired connection or a wireless connection.

As used herein the term "EM sensor" means a device that outputs at least one analog signal indicating the intensity of a magnetic field in its vicinity. The EM sensor may include one or more probes, each probe outputting a respective measurement signal.

As used herein the term "probe" means a device that produces an electronic output signal in response to electromagnetic field radiation in its vicinity.

As used herein the term "passive probe" means a probe that operates without an external power source.

As used herein the term "active probe" means a probe that is powered by a power source.

I.1) Aerial Vehicle Unit (AVU)

Aerial vehicle unit (AVU) 110 is attached to aerial vehicle 105 and includes AVU circuitry 180. FIGS. 1B-1D show exemplary embodiments of AVU circuitry 180 and are described below.

AVU may be attached to aerial vehicle 105 by any means known in the art. In one example AVU 110 is mounted on the exterior of the aerial vehicle by screws or a similar mechanical fastener. In a second example the AVU is connected to an interior surface of the aerial vehicle. In a third example the AVU is built into the surface of the aerial vehicle.

AVU circuitry 180 performs digital signal processing on at least one digital signal using one or more processors. Optionally, AVU circuitry 180 includes an A/D converter which converts at least one analog signal input from hanging platform circuitry 150 into a digitized signal (for example as shown in FIG. 1B).

Optionally, the digitized signal and/or results of the digital signal processing are stored in an onboard memory. Alternately or additionally, the digitized sensor signal and/or results of the digital signal processing are transmitted over a wireless communication link (e.g. to a ground station).

AVU circuitry 180 may also perform additional digital signal processing of the digitized signal. Examples of this additional digital signal processing include but are not limited to:
a) Signal weight reduction;
b) Signal compression;
c) Encryption;
d) Validating quality of data;
e) Tagging anomalies to ease future work; and
f) Using the digitized signal data to flag problematic flight patterns.

Optionally, AVU circuitry 180 and hanging platform circuitry 150 include respective wireless communication interfaces 184 and 153, providing wireless signal connection 131.3 between AVU circuitry 180 and hanging platform circuitry 150. Optionally, the wireless signal communication protocol is Bluetooth Low Energy (BLE).

Figure 2:
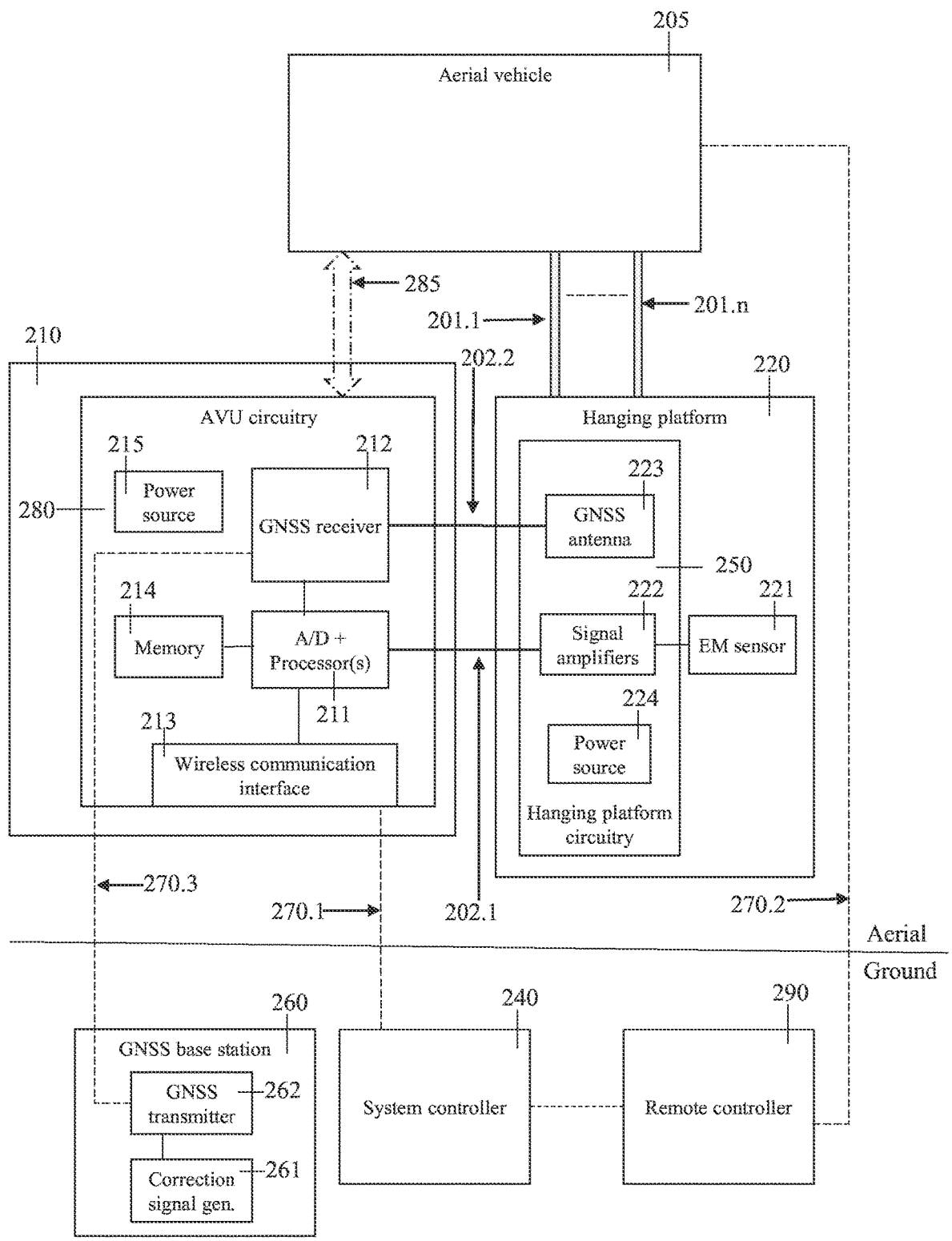
FIG. 2 is a simplified block diagram of an aerial detection system with wireless communication capabilities, according to an exemplary embodiment of the invention.

Optionally AVU circuitry 180 includes a transmitter (not shown) for transmitting results of the processing performed by AVU circuitry 180 over a wireless communication link (for example to a ground-based system controller as shown in FIG. 2). Alternately or additionally, EM sensor location data obtained by GNSS positioning is transmitted over the wireless communication link.

Optionally AVU circuitry 180 includes a local memory (not shown) which may store the results of the processing performed by AVU circuitry 180 and/or the EM sensor location data. The memory may also store instructions which are executed by one or more processors in AVU circuitry 180.

Optionally, wired signal connections between hanging platform circuitry 150 and AVU circuitry 180 are made through one or more baluns. Using baluns reduces crosstalk between different channels and RF interference and balances the load.

Optionally, AVU circuitry 180 is connected to circuitry in the aerial vehicle (not shown). Thus existing resources in the aerial vehicle may be leveraged for use by AVU 110. For example, data collected by aerial vehicle unit 110 may be stored in a memory in aerial vehicle 105. In a second example, some digital signal processing is performed by a processor in aerial vehicle 105.

Types of processors which may be part of AVU circuitry 180 include but are not limited to: general purpose central processing unit (CPU), field programmable gate array (FPGA), digital signal processor (DSP), an application specific integrated circuit (ASIC), edge artificial intelligence (AI) processor and/or single board computer.

Optionally, AVU circuitry 180 includes a power source to power electronic components as needed.

I.2) Hanging Platform

Hanging platform 120 connects to aerial vehicle 105 using flexible links 130.1-130.4 and is configured to hang from aerial vehicle 105 during flight. EM sensor 140 is mounted on hanging platform 120 and outputs at least one analog signal indicative of electromagnetic field (EMF) radiation captured by EM sensor 140. Optionally, each analog signal is output by a respective probe within EM sensor 140.

Hanging platform circuitry 150 performs analog signal processing on the EM sensor output signal(s). In the case of multiple EM sensor output signals, hanging platform circuitry 150 includes capabilities for processing multiple signals (for example a respective signal amplifier for each probe output signal). FIGS. 1B-1D show exemplary embodiments of hanging platform circuitry 150 and are described below.

Optionally, hanging platform circuitry 150 includes one or more signal amplifiers which amplify respective EM sensor output signals.

Optionally, hanging platform circuitry includes an analog to digital (A/D) converter which digitizes analog output signal(s) at the EM sensor output(s) or after further analog processing (e.g. filtering and/or amplification). Further optionally, hanging platform circuitry includes a digital processor which performs digital signal processing on the A/D converter output signals. The resulting digital signals are output to AVU circuitry 180 over signal connection 131.1.

As described above, hanging platform circuitry 150 optionally also performs analog signal processing.

It is noted that the output(s) of hanging platform circuitry 150 may be analog and/or digital signals, depending on the electronic elements in hanging platform circuitry 150.

Optionally, hanging platform circuitry 150 includes a wireless communication interface.

Optionally, EM sensor 140 includes at least one passive probe. Using passive probes keeps the area of the hanging platform quiet from electromagnetic interference.

Examples of passive probes include but are not limited to:
a) High-permeability core antenna;
b) Air coil;
c) Search coil; and
d) Flux gate.

Optionally, EM sensor 140 includes at least one active probe. Examples of active probes which may be used include but are not limited to dipole antennas and E-field probes.

Figure 5:
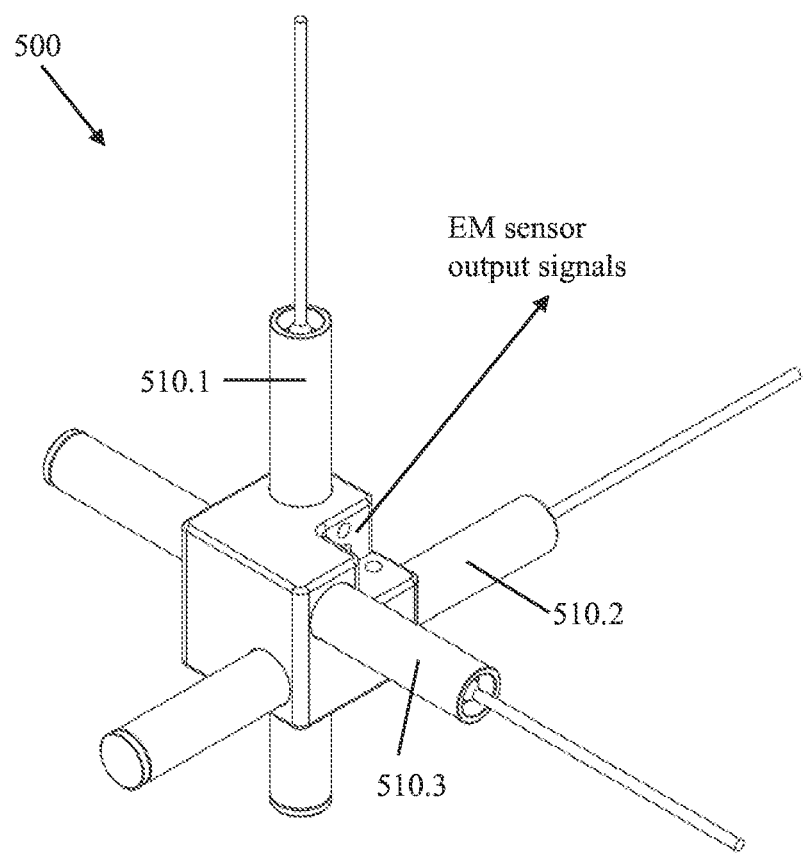
FIG. 5 is a simplified isometric illustration of an exemplary three-axis EM sensor.

Optionally, EM sensor 140 includes multiple passive probes (as shown for example in FIG. 5). Each of the passive probes senses the electromagnetic field along a respective axis. The analog output of each probe is connected to the input of a respective signal amplifier. The amplified sensor outputs are connected to respective A/D inputs in AVU circuitry 180.

Optionally, hanging platform circuitry 150 includes a power source to power electronic components as needed.

I.3) GNSS Positioning

In order to map underground utilities by analyzing the collected EM sensor data, it is desirable to track the EM sensor location with a high level of accuracy during data collection.

Optionally, aerial detection system 100 includes global navigation satellite system (GNSS) antenna 170 mounted on hanging platform 120 and GNSS receiver 190 in AVU 110. The output of GNSS antenna 170 is connected to GNSS receiver 190 via a signal connection (e.g. signal connection 131.2 in FIG. 1B). The EM sensor location data is provided by GNSS receiver 190 to AVU circuitry 180. The location data may be stored in a memory and/or transmitted to a base station along with the collected EM sensor data for offline processing.

When the location data obtained by a standard GNSS receiver is not accurate enough, the accuracy may be improved using any technique known in the art. In one example, accuracy is improved using real-time kinematic positioning (RTK) by a rover in AVU 110. The rover uses a correction signal transmitted by a reference station to calculate a more accurate location for GNSS antenna 170, either in real-time or post-processing.

I.4) Exemplary Embodiments of Hanging Platform and AVU Circuitry

Reference is now made to FIG. 1B, which is a simplified block diagram of a first exemplary embodiment of an aerial detection system. Hanging platform 120 carries EM sensor 140 and hanging platform circuitry 150. Hanging platform circuitry 150 and AVU circuitry 180 are connected by two wired signal connections 131.1-131.2.

In the embodiment of FIG. 1B, hanging platform circuitry 150 includes:
a) Signal amplifiers 151 which amplify respective outputs of EM sensor 140; and
b) GNSS antenna 170.

AVU circuitry 180 includes:
a) Analog to digital (A/D) converter 181 which digitizes one or more analog amplified EM sensor signals;
b) Digital processor 182 which processes the digitized signals; and
c) GNSS receiver 190.

Baluns 132 and 133 prevent crosstalk in signal connection 131.1.

Reference is now made to FIG. 1C, which is a simplified block diagram of a second exemplary embodiment of an aerial detection system.

Hanging platform 120 carries EM sensor 140 and hanging platform circuitry 150. Hanging platform circuitry 150 and AVU circuitry 180 are connected by two wired signal connections 131.1-131.2.

In the embodiment of FIG. 1C, hanging platform circuitry 150 includes:
a) GNSS antenna 170; and
b) Conductive element 152 which connects the EM sensor output(s) to signal connection 131.1 via balun 132. Conductive element 152 optionally includes an analog filter to filter the EM sensor output signals.

AVU circuitry 180 includes:

a) Signal amplifiers 183 which amplify the outputs of EM sensor 140;

b) A/D converter 181 which digitizes the outputs of signal amplifiers 183;

c) Digital processor 182 which processes the digitized signals; and d) GNSS receiver 190.

Hanging platform circuitry 150 and AVU circuitry 180 are connected by two wired signal connections 131.1-131.2.

Reference is now made to FIG. 1D, which is a simplified block diagram of a third exemplary embodiment of an aerial detection system.

Hanging platform 120 carries EM sensor 140 and hanging platform circuitry 150.

In the embodiment of FIG. 1D, hanging platform circuitry 150 includes:

a) GNSS antenna 170;

b) Signal amplifiers 151;

c) A/D converter 154 which digitizes the outputs of signal amplifiers 151; and d) Wireless communication interface 153.

AVU circuitry 180 includes:

a) Wireless communication interface 184 which communicates with wireless communication interface 153 over wireless connection 131.3. In one example, the wireless signal communication protocol is Bluetooth Low Energy (BLE);

b) Digital processor 182 which processes the outputs of A/D converter 154; and c) GNSS receiver 190.

I.5) Flexible Links

The number and types of the flexible links are based on operational requirements. The material, structure and connectors of the flexible links are designed to enable the aerial vehicle to support the hanging platform with the required stability during flight.

Optionally, the flexible links are connected to the hanging platform and to the aerial vehicle by a swivel-type connection that enables the hanging platform to swing lightly without significantly affecting the flight of the aerial vehicle or the trajectory of the hanging platform.

Figure 3:
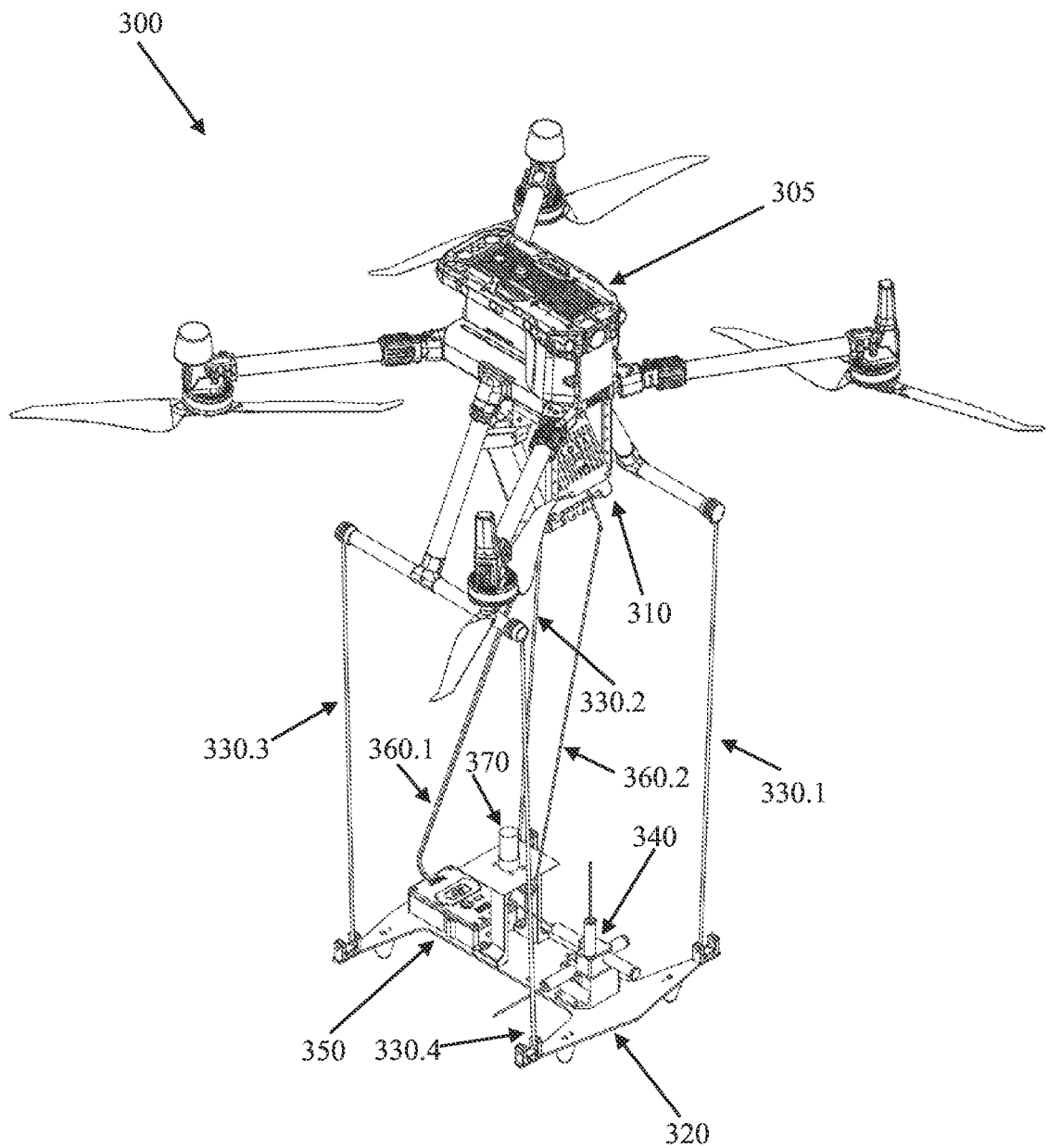
FIG. 3 is a simplified isometric drawing of an aerial detection system according to an exemplary embodiment of the invention.

The hanging platform may be connected to the aerial vehicle by any means known in the art. In one example the flexible links connect to a frame mounted over the legs of the aerial vehicle. In a second example the flexible links clip directly on to the legs of the aerial vehicle (as shown in FIG. 3).

The lengths of the flexible links create a physical distance between EM sensor 140 and AVU 110/aerial vehicle 105 during flight. This physical distance reduces the noise levels near the sensitive EM sensor dramatically, allowing it to pick up lower amplitude signals than would be possible if the EM sensor was close to noisy, active elements. Optionally, the length of the flexible links is within the range of 1-1.5 meters.

Examples of materials which may be suitable for flexible links include but are not limited to:

1) Rope;
2) Canvas strap;
3) Cord;
4) Cable;
5) Line;
6) String; and
7) Chain/link based material.

I.6) Signal Connections

Examples of signal connections include but are not limited to:

1) Wires;
2) Electrical cables—for example a coaxial cable with BNC connectors;
3) Data cables—for example a registered jack (RJ) RJ-45 based cable; and
4) Wireless connections.

When AVU 110 and hanging platform 120 are connected by a wireless connection, AVU circuitry 180 and hanging platform circuitry 150 include respective wireless communication interfaces.

Some cables have multiple channels. For example, the RJ-45 cable has four twisted pair channels. Thus a single cable may connect multiple inputs of AVU circuitry 180 to respective outputs of hanging platform circuitry 150.

II) Aerial Detection System with Ground Components

Reference is now made to FIG. 2, which is a simplified block diagram of an aerial detection system with wireless communication capabilities, according to an exemplary embodiment of the invention. The aerial detection system includes AVU 210 and hanging platform 220. Hanging platform 220 is mechanically connected to aerial vehicle 205 by n flexible links 201.1-201.*n*.

Hanging platform circuitry 250 includes EM sensor 221, signal amplifier(s) 222, GNSS antenna 223 and power source 224, which operate in accordance with the embodiments described above. Signal amplifier(s) 222 are connected to A/D and processor(s) 211 (in AVU circuitry 280) by signal connection 202.1. Optionally a balun is connected at both sides of signal connection 202.1. In alternate embodiments, signal amplifier(s) 222 are located in AVU 210 and EM sensor 221 connects directly to signal connection 202.1.

Hanging platform circuitry 250 may include additional components which provide further information that is used for analysis and/or processing. For example, hanging platform circuitry 250 may include a clock (not shown) and provide digital time stamp information to AVU circuitry 280 over a wired or wireless signal connection.

AVU circuitry 280 includes A/D and processor(s) 211. A/D and processor(s) 211 includes an analog to digital (A/D) converter and at least one processor. The A/D converter converts the amplified EM sensor analog output signals to digital signals. The processor(s) process the digitized EM sensor signals according to any of the embodiments described herein.

Signal connection 202.1 connects signal amplifiers 222 to A/D and Processor(s) 211. Signal connection 202.2 connects GNSS antenna 223 to GNSS receiver 212. Signal connection 202.2 may be wired or wireless.

Optionally, AVU circuitry 280 further includes at least one of:

a) GNSS receiver 212 which is connected to GNSS antenna 223 over signal connection 202.2 which serves as an antenna cable. When location information accuracy is improved based on the correction signal transmitted by GNSS base station 260, GNSS receiver 212 may be incorporated into a rover or equivalent system which receives the correction signal transmitted by GNSS base station 260 and calculates a more accurate location.

b) Wireless communication interface 213—The wireless communication capabilities enable the aerial detection system to communicate with ground stations which interact with the aerial detection system. Exemplary ground stations shown in FIG. 2 are: system controller 240, remote controller 290 and GNSS base station 260.

c) Memory 214 is an internal memory. Types of information which may be stored in memory 214 include but are not limited to: raw data after A/D conversion of the EM sensor signals, processed data after processing of the digitized EM signals, GNSS location data and program instructions for execution by a processor in AVU 210.

d) Power source 215 for powering the active components in AVU 210. Optionally the power source is a battery (for example a single 10,000 mAh battery that powers the entire AVU or equivalent). Alternately or additionally, the power is supplied by the drone over a power connection to the drone circuitry.

Optionally, GNSS base station 260 transmits a GNSS correction signal over wireless communication link 270.3. The correction signal is used to improve the accuracy of the location calculated by GNSS receiver 212 on AVU 210. The correction signal is generated by signal generator 261 and is transmitted by GNSS transmitter 262. GNSS correction may be performed by any means known in the art.

Optionally, GNSS receiver 212 includes an internal wireless communication interface (not shown) which receives the signal from GNSS base station 260. In alternate optional embodiments, the correction signal is received by wireless communication interface 213 and forwarded to GNSS receiver 212.

System controller 240 communicates with AVU 210 over wireless communication link 270.1. The function of system controller 240 is to manage system operation. Functions which may be performed by system controller include but are not limited to:

1) Controlling AVU 210;
2) Passing commands to AVU 210 and receiving outputs from AVU 210 (e.g. start and stop data acquisition);
3) Monitoring data acquisition; and
4) Reporting failures to the operator.

Remote controller 290 controls the flight path of aerial vehicle 205 over wireless communication link 270.2. Optionally, remote controller 290 controls the flight path based on instructions sent to it by system controller 240. Thus system controller 240 is able to adapt the flight path as needed in order to collect EM sensor data over the area being mapped. Optionally, system controller 240 and remote controller 290 may also communicate with each other wirelessly (e.g. WiFi or Bluetooth).

Optionally electronic components in AVU 210 (e.g. processor, memory, etc.) are connected to electronic components in aerial vehicle 205 by connection 285. This enables some of the processing and/or storage to be done on the aerial vehicle instead of by components in AVU 210. For example, data and power may be passed from aerial vehicle 205 to AVU 210 and/or a single wireless link may be used between the ground stations and the aerial detection system.

III) Exemplary Aerial Detection System

Reference is now made to FIG. 3, which is a simplified isometric drawing of an aerial detection system according to an exemplary embodiment of the invention. Aerial detection system 300 includes AVU 310, hanging platform 320 and flexible links 330.1-330.4.

AVU 310 is attached to aerial vehicle 305. FIG. 3 shows a non-limiting exemplary embodiment in which aerial vehicle 305 is a DJI® Matrice® 300 drone. Other suitable drones may be used.

Optionally, AVU 310 includes an A/D converter and processor(s) (not shown).

Hanging platform 320 includes three-probe EM sensor 340 followed by signal amplifiers 350. Flexible links 330.1-330.4 connect hanging platform 320 mechanically to aerial vehicle 305. Signal amplifiers 350 are connected to AVU 310 via cable 360.1 (e.g. an RJ-45 Ethernet cable). Optionally the signal connection is made through baluns at each end. GNSS antenna 370 is connected to AVU 310 by cable 360.2.

Figure 4A:
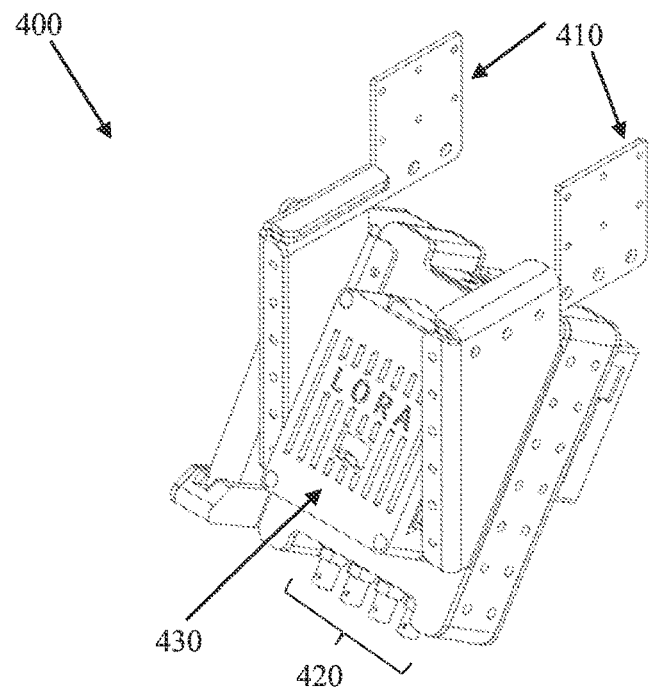
FIGS. 4A-4B are simplified isometric illustrations of an exemplary aerial vehicle unit from two angles.
Figure 4B:
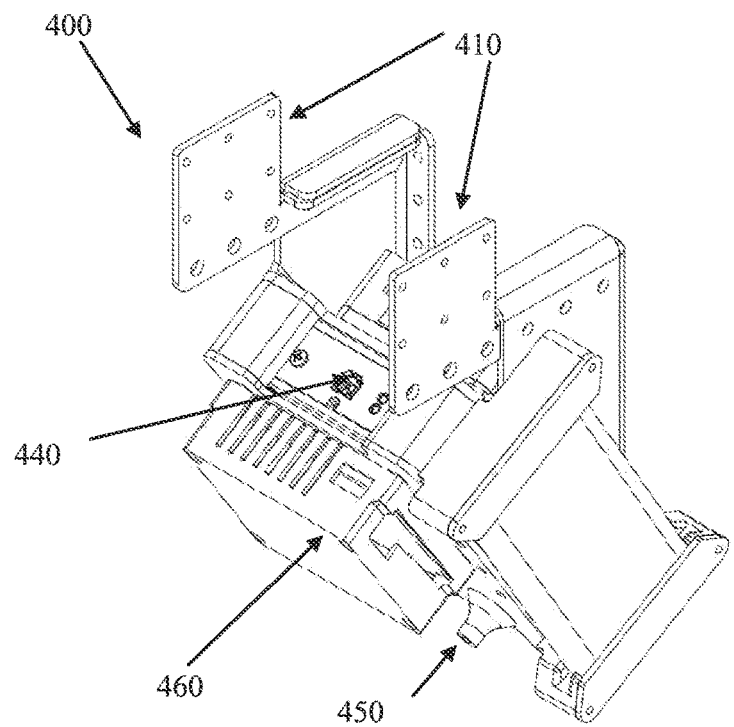

Reference is now made to FIGS. 4A-4B, which are isometric illustrations of an exemplary AVU from two angles.

Mounts 410 are used to attach AVU 400 to the aerial vehicle.

Connectors 420 are electrical connectors for inputting signals from hanging platform circuitry over a wired signal connection. Three of the connectors input amplified signals from the EM sensor. The fourth connector connects a channel that is used to tie the location generated by the GNSS system to the measurement taken in that location and time. This is done using a pulse per second (PPS) channel that the GNSS receiver outputs and which is connected to the fourth slot of the A/D converter. Then, post-process registration allows the matching of location and signal data.

LORA unit 430 includes a LORA receiver and a GNSS receiver. The LORA receiver receives the GNSS correction signal from a base station and forwards it to the GNSS receiver found in the same casing.

A/D outputs 440 output the digitized signals from the A/D converter.

Balun mount 450 is a connector for a balun (if used);

Onboard computer 460 includes one or more processors used for processing operations.

Reference is now made to FIG. 5, which is an isometric illustration of an exemplary three-axis EM sensor. EM sensor 500 includes three probes 510.1-510.3, each of which senses EMF radiation in a respective axis. The probe signals are output in parallel.

Figure 6A:
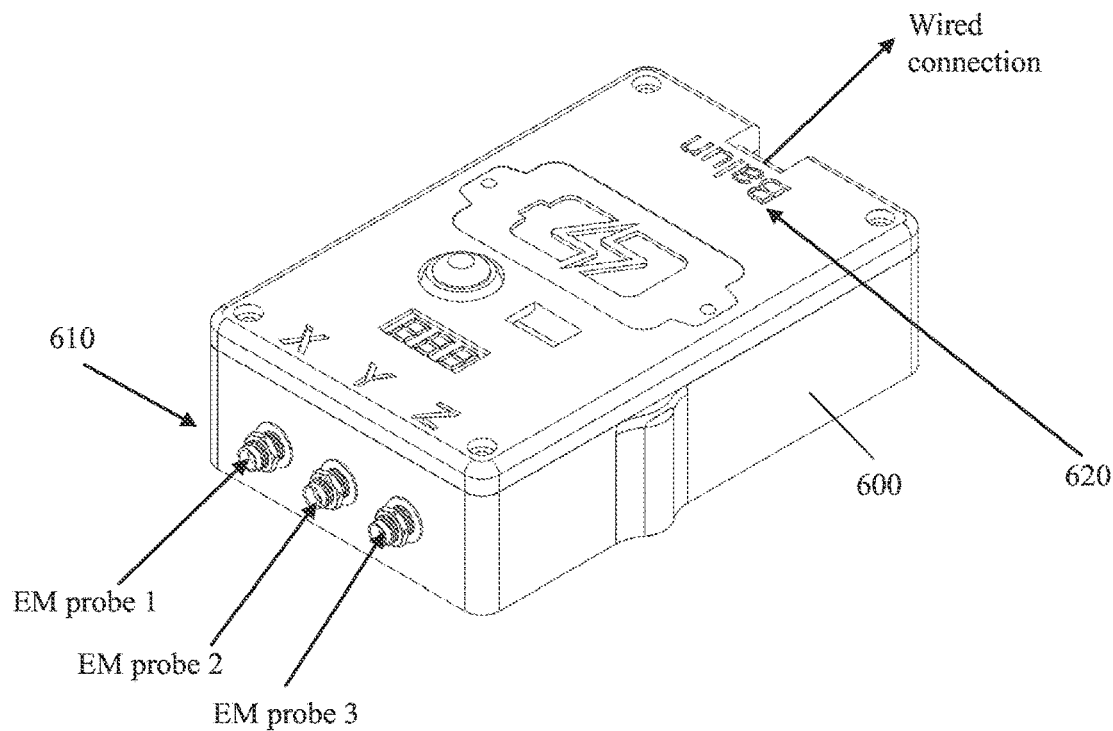
FIGS. 6A-6B are simplified isometric illustrations of an exemplary signal amplifier unit from two angles respectively.
Figure 6B:
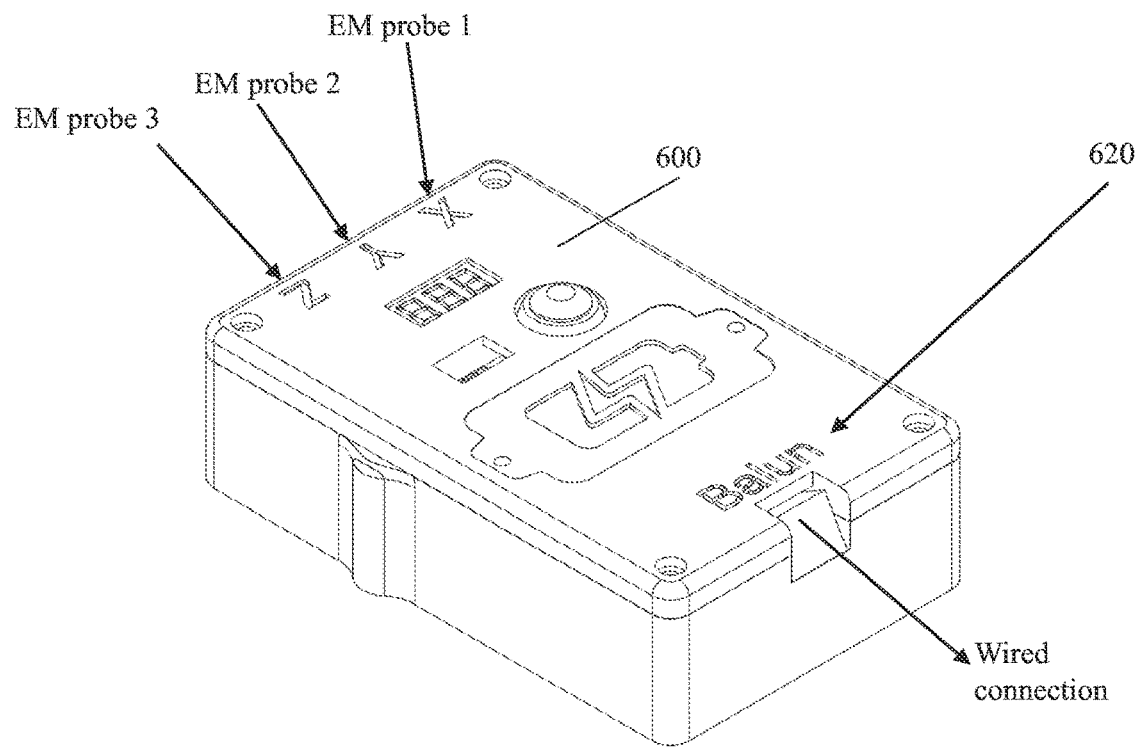

Reference is now made to FIGS. 6A-6B, which are isometric illustrations of an exemplary signal amplifier unit from two angles. Signal amplifier unit 600 includes a power source and three signal amplifiers, each of which connects to a respective EM probe via one of connectors 610. The signal amplifier outputs are connected in parallel to a wired signal connection via baluns 620.

Figure 7A:
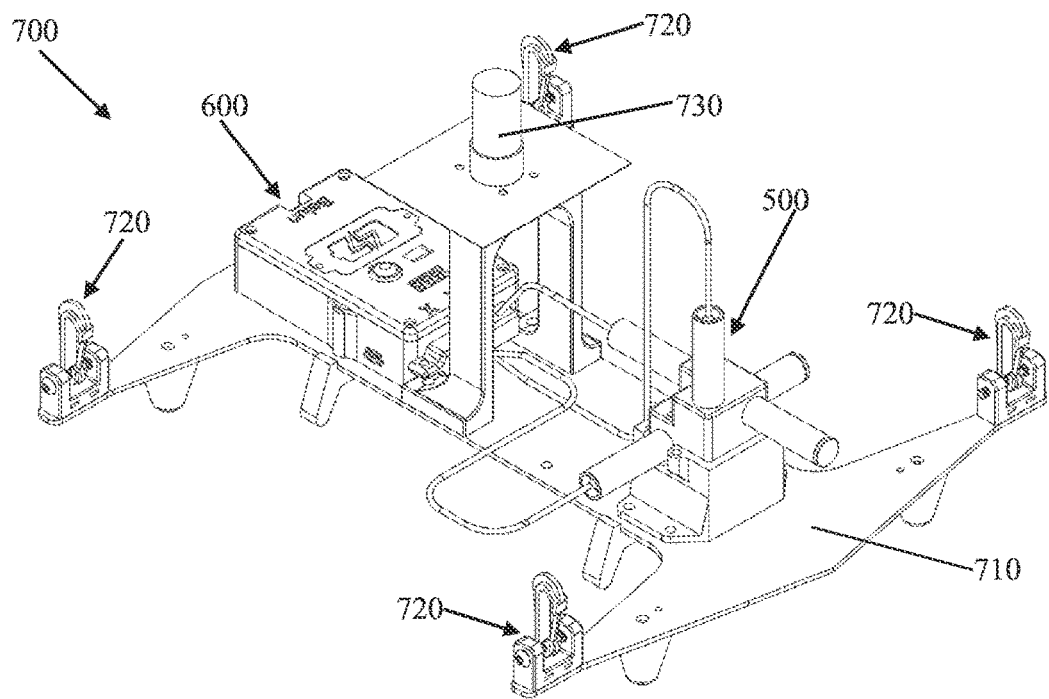
FIGS. 7A-7B are simplified isometric illustrations of an exemplary hanging platform unit from two angles respectively.
Figure 7B:
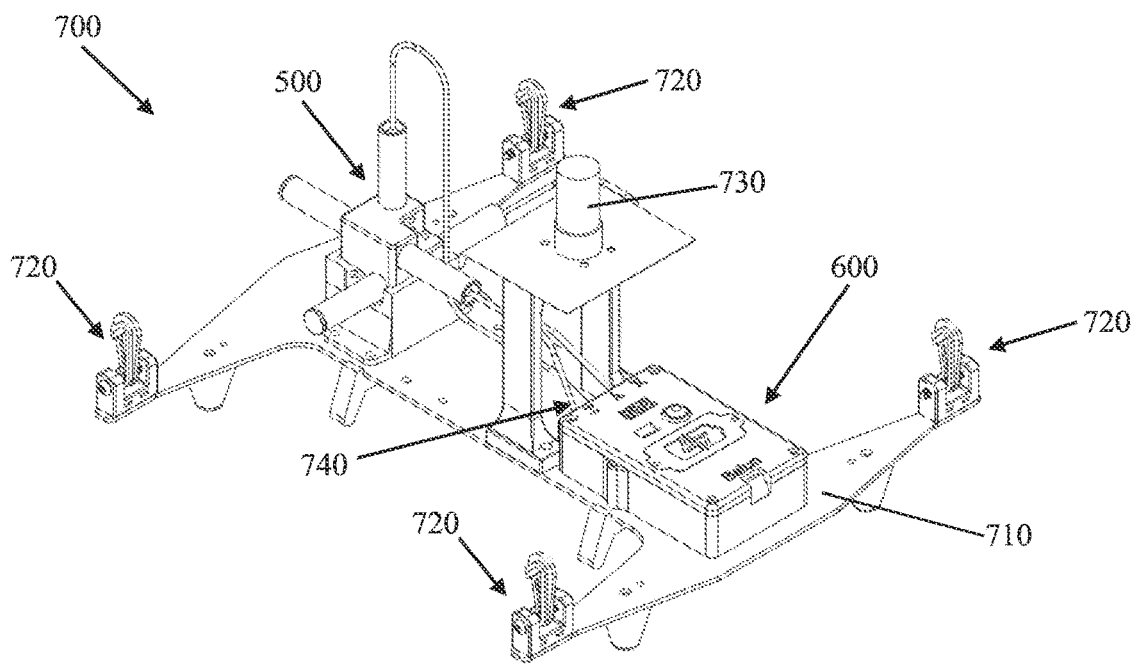

Reference is now made to FIGS. 7A-7B, which are isometric illustrations of an exemplary hanging platform unit from two angles. The hanging platform circuitry includes signal amplifier unit 600 and GNSS antenna 730. EM sensor 500 and signal amplifier unit 600 are mounted on base 710. GNSS antenna 730 is mounted on a support above base 710 in order to get a better sky view. The outputs of EM sensor 500 are connected to inputs 740 of signal amplifier unit 600. Base 710 has four mechanical connectors 720 which the flexible links can connect to.

Figure 7C:
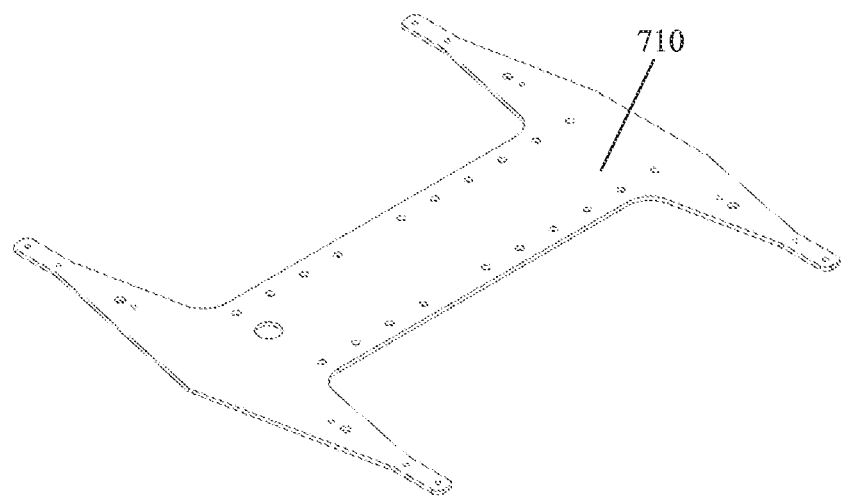
FIG. 7C is a simplified isometric illustration of an exemplary hanging platform base.

FIG. 7C is a simplified isometric illustration of an exemplary hanging platform base 710. Additional components of the hanging platform may be mounted on the base.

Figure 7D:
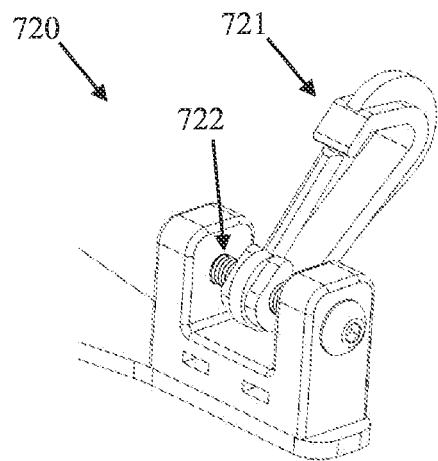
FIGS. 7D, 7E and 7F are simplified isometric illustrations of an exemplary mechanical connector with a rotating clip in three respective positions.
Figure 7E:
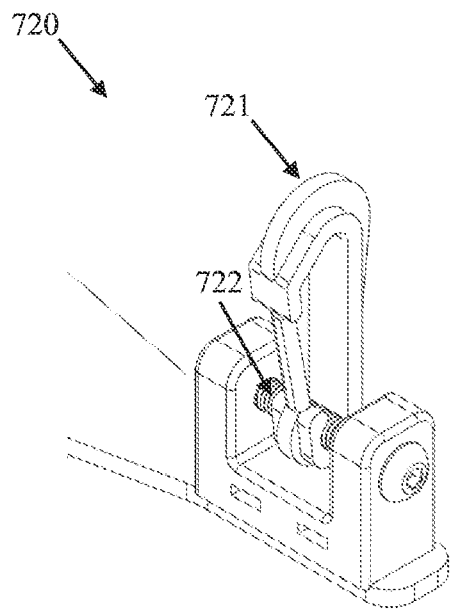
Figure 7F:
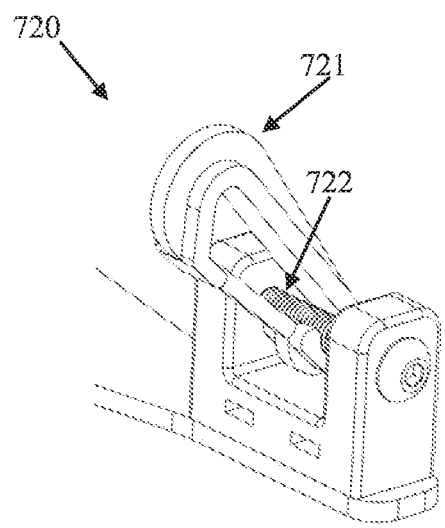

FIGS. 7D-7F are simplified isometric illustrations of an exemplary mechanical connector 720 with a rotating clip in three respective positions. Clip 721 may rotate around rod 722 and move laterally along rod 722, providing a wide range of movement for the mechanical link.

IV) Rigid Link Aerial Detection System

In some embodiments of the invention, one or more of the mechanical links connecting the hanging platform to the aerial vehicle has very limited or no flexibility (denoted herein rigid links). Optionally, the mechanical connections additionally include one or more flexible links. The number and types of the rigid links are based on operational requirements. The material, structure and connectors of rigid and/or flexible links enable the aerial vehicle to support the hanging platform with the required stability during flight.

The above-described embodiments for the aerial detection system are suitable for the aerial detection system with rigid links (denoted herein the rigid link aerial detection system).

The basic structure of the rigid link aerial detection system includes a hanging platform connected to an aerial vehicle by one or more rigid links. The hanging platform includes an EM sensor and hanging platform circuitry, substantially as described above. An AVU with AVU circuitry is attached to the aerial vehicle, substantially as described above.

Examples of materials for which may be suitable for rigid links include but are not limited to:

1) A single Fiberglass rod that connects to the AVU to the aerial vehicle;
2) A collapsible structure that ruggedizes when under tension; and
3) A Pyramid like structure that holds the AVU.

The AVU circuitry and hanging platform circuitry are connected by one or more wireless and/or wired signal connections.

Optionally, the EM sensor includes multiple passive probes for sensing the electromagnetic field along respective axes. The outputs of the passive probes may be processed in parallel.

Optionally, the location of the EM sensor is determined using GNSS. The hanging platform circuitry includes a GNSS antenna and the AVU circuitry includes GNSS receiver. The GNSS antenna and GNSS receiver are connected by a wired or wireless connection. Further optionally, localization accuracy is improved using a signal received from a ground station (e.g. RTK correction) as described above.

In an exemplary embodiment, hanging platform circuitry includes one or more signal amplifiers which amplify respective EM sensor analog output signals. The AVU circuitry includes an A/D converter that digitizes the amplified EM sensor signals and a digital processor for processing the digitized signals.

As will be appreciated by the skilled person, other embodiments may place components differently in the hanging platform circuitry and the AVU circuitry. For example, the signal amplifiers may be located in the AVU circuitry. Alternately, the A/D converter may be located in the hanging platform circuitry.

Examples of processing which may be performed on the analog signal(s) output by the EM sensor include but are not limited to:

1) Amplification;
2) Filtering; and
3) A/D conversion.

Examples of digital signal processing which may be performed on the EM sensor outputs after analog processing and A/D conversion include but are not limited to:

a) Storage in a local memory;
  b) Transmission to a ground station;
  c) Signal weight reduction;
  d) Signal compression;
  e) Encryption;
  f) Validating quality of data; and
  g) Tagging anomalies to ease future work.

V) Method of Assembly of an Aerial Detection System

Figure 8:
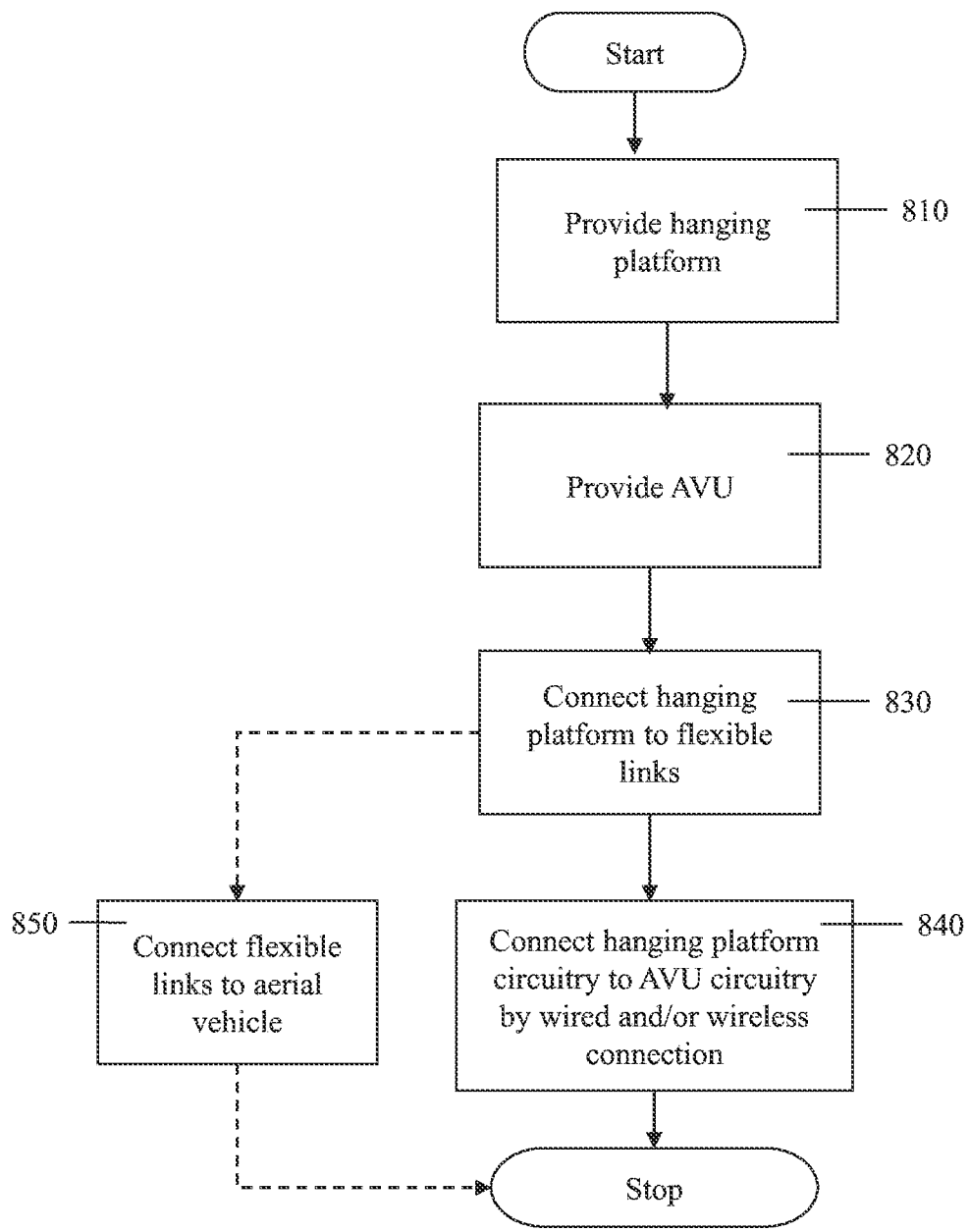
FIG. 8 is a simplified flowchart of a method of assembling a system for electromagnetic surveying, according to embodiments of the invention.

Reference is now made to FIG. 8, which is a simplified flowchart of a method of assembling a system for electromagnetic surveying, according to embodiments of the invention.

In 810 a hanging platform with mounted EM sensor and hanging platform circuitry is provided. The EM sensor is capable of capturing electromagnetic field (EMF) radiation in at least one axis and outputting at least one analog signal indicative of the EMF radiation. The hanging platform circuitry is configured to perform analog signal processing on the EM sensor output signals.

Optionally, the hanging platform circuitry additionally includes an A/D converter configured to perform A/D conversion on the processed analog signals.

In 820 an aerial vehicle unit (AVU) with AVU circuitry is provided. The AVU shape and construction enable it to be attached to an aerial vehicle. For example, the AVU may have flanges for attaching the AVU to the exterior or interior of the aerial vehicle.

The AVU circuitry includes at least one processor configured to digitally process at least one signal originating from the hanging platform. In one example, the AVU circuitry includes an A/D converter capable of digitizing at least one analog signal and a digital processor configured to process the digitized signals.

In 830 the hanging platform is connected to at least one flexible link capable of mechanically connecting the hanging platform to an aerial vehicle in a manner that allows the aerial vehicle to suspend the hanging platform during flight. Optionally, in 850 the flexible links are also mechanically connected to the aerial vehicle. Optionally, the flexible links for mechanically connecting the hanging platform to the aerial vehicle have a detachable mechanical fastener on one or both ends. Optionally, at least one of the flexible links has a swivel connection at one or both ends.

In 840, hanging platform circuitry outputs are connected to AVU circuitry inputs. Optionally, the connection is a wired connection formed by connecting one or more cables between the hanging platform circuitry and the AVU circuitry. In alternate or additional embodiments, the connection is a wireless connection formed by the hanging platform circuitry to a first wireless communication interface and the AVU circuitry to a second wireless communication interface.

In one example, the EM sensor includes a single probe for sensing the EMF radiation. The probe may be passive or active.

In an alternate example, the EM sensor includes multiple probes for sensing the EMF radiation along different axes. Analog outputs of the passive probes are connected to respective signal amplifier inputs.

Optionally, the method further includes mounting a global navigation satellite system (GNSS) antenna on the hanging platform. The GNSS antenna output is connected to a GNSS receiver via a signal connection. The GNSS receiver may be located in the AVU.

Optionally, the method further includes connecting the AVU circuitry to a wireless transmitter.

Optionally, the method further includes connecting the AVU circuitry to a memory.

Optionally, the method further includes connecting the AVU circuitry to electronic circuitry in the aerial vehicle.

In summary, embodiments of the aerial detection system presented herein are a highly sensitive sensor system designed to hang from an aerial vehicle during flight. Because it uses a low-weight EM sensor, the system may be carried by highly-maneuverable small drones and is suitable for mapping large and dense geographical areas.

It is expected that during the life of a patent maturing from this application many relevant aerial vehicles, platforms, EM sensors, EM probes, signal amplifiers, satellite navigation systems, analog to digital converters, digital circuitry, digital processors, baluns, signal connections, materials for flexible mechanical connections, materials for rigid mechanical connections, mechanical connectors, and techniques for correcting errors in GNSS systems will be developed and the scope of the terms aerial vehicle, platform, hanging platform, EM sensor, EM probe, signal amplifier, satellite navigation system, global navigation satellite system (GNSS), analog to digital converters, circuitry, digital processor, balun, signal connection, flexible link, rigid link and mechanical connector are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system comprising:
   at least one flexible link;
   a hanging platform adapted to be mechanically connected to an aerial vehicle by said at least one flexible link and having mounted thereon:
      an electromagnetic (EM) sensor configured to output at least one analog signal indicative of electromagnetic field (EMF) radiation captured by said EM sensor; and
      a first circuitry configured to perform at least analog signal processing on an output of said EM sensor and to output at least one analog processed EM sensor signal, said first circuitry comprising a global navigation satellite system (GNSS) antenna configured to receive GNSS signals; and
   an aerial vehicle unit adapted to be attached to said aerial vehicle, comprising a second circuitry configured to input said at least one analog processed EM sensor signal, to perform analog to digital conversion of said input signal and digital signal processing of a result of said analog to digital conversion, and to output a result of said digital signal processing, said second circuitry comprising a GNSS receiver connected by a wired connection to an output of said GNSS antenna and configured to calculate EM sensor locations during data collection by said EM sensor.

2. The system of claim 1, wherein said at least one analog processed EM sensor signal is provided by said first circuitry to said second circuitry by at least one wireless connection.

3. The system of claim 1, wherein said at least one analog processed EM sensor signal is provided by said first circuitry to said second circuitry by at least one wired connection.

4. The system of claim 1, wherein said second circuitry is connected to a circuitry of said aerial vehicle.

5. The system of claim 1, wherein said EM sensor comprises a passive probe.

6. The system of claim 5, wherein said passive probe comprises a high-permeability core antenna.

7. The system of claim 1, wherein said EM sensor comprises an active probe.

8. The system of claim 1, wherein said EM sensor comprises a plurality of passive probes configured to sense said electromagnetic field along respective axes and a plurality of signal amplifiers configured for amplifying respective analog outputs of said plurality of passive probes.

9. The system of claim 1, wherein said second circuitry comprises:
an analog to digital converter configured to digitize said at least one analog processed EM sensor signal input from said first circuitry; and
at least one digital processor configured to perform said digital signal processing.

10. The system of claim 1, wherein said second circuitry comprises at least one of:
a memory configured for storing results of said processing and EM sensor location data; and
a transmitter configured to transmit results of said processing over a wireless communication link.

11. The system of claim 1, wherein an input of said GNSS receiver is connected to an output of said GNSS antenna by a wired connection.

12. A method of assembling a system for electromagnetic surveying, comprising:
providing a hanging platform having mounted thereon an electromagnetic (EM) sensor configured to capture electromagnetic field (EMF) radiation and a first circuitry configured to perform at least analog signal processing on an output of said EM sensor and to output at least one analog processed EM sensor signal at an analog output, said first circuitry comprising a global navigation satellite system (GNSS) antenna configured to receive GNSS signals;
providing an aerial vehicle unit configured to be attached to an aerial vehicle, comprising a second circuitry configured to input said at least one analog processed EM sensor signal at an analog input, to perform analog to digital conversion of said input signal and digital signal processing of an output of said first circuitry and to output a result of said digital signal processing, said second circuitry comprising a GNSS receiver configured to be connected to said GNSS antenna so as to calculate EM sensor locations during data collection by said EM sensor;
mechanically connecting said hanging platform to an aerial vehicle by at least one flexible link; and
connecting said analog output of said first circuitry to said analog input of said second circuitry.

13. The method of claim 12, wherein said analog output of said first circuitry and said analog input of said second circuitry are configured for connection by wireless communication.

14. The method of claim 12, further comprising connecting said analog output of said first circuitry and said analog input of said second circuitry by at least one wired connection.

15. The method of claim 12, further comprising connecting said second circuitry to a circuitry of said aerial vehicle.

16. The method of claim 12, further comprising connecting said GNSS antenna to said GNSS receiver by a wired connection.

17. The method of claim 12, wherein said EM sensor comprises a passive probe configured for sensing said EMF radiation.

18. The method of claim 12, wherein said EM sensor comprises a plurality of passive probes configured to sense said EMF radiation along respective axes, said method further comprising connecting analog outputs of said passive probes to respective analog inputs of a plurality of signal amplifiers in said first circuitry.

19. The method of claim 12, further comprising connecting said second circuitry to at least one of:
a transmitter configured to transmit results of said processing over a wireless communication link; and
a memory configured to store results of said processing.

20. A system comprising:
at least one rigid mechanical link;
a hanging platform adapted to be mechanically connected to an aerial vehicle by said at least one rigid mechanical link and having mounted thereon:
an electromagnetic (EM) sensor configured to output at least one analog signal indicative of electromagnetic field (EMF) radiation captured by said EM sensor; and
a first circuitry configured to perform at least analog signal processing on an output of said EM sensor and to output at least one analog processed EM sensor signal, said first circuitry comprising a global navigation satellite system (GNSS) antenna configured to receive GNSS signals; and
an aerial vehicle unit adapted to be attached to said aerial vehicle, comprising a second circuitry configured to input said at least one analog processed EM sensor signal, to perform analog to digital conversion of said input signal and digital signal processing of a result of said analog to digital conversion, and to output a result of said digital signal processing, said second circuitry comprising a GNSS receiver connected by a wired connection to an output of said GNSS antenna and configured to calculate EM sensor locations during data collection by said EM sensor.

21. The system of claim 20, wherein said at least one analog processed EM sensor signal is provided by said first circuitry to said second circuitry by at least one wireless connection.

22. The system of claim 20, wherein said at least one analog processed EM sensor signal is provided by said first circuitry to said second circuitry by at least one wired connection.

23. The system of claim 20, wherein said EM sensor comprises a plurality of passive probes and said first circuitry comprises a plurality of signal amplifiers connected to respective outputs of said plurality of passive probes, and said second circuitry comprises an analog to digital converter configured to digitize respective output signals from said signal amplifiers and a digital processor configured to process said digitized signals.

24. The system of claim 20, wherein an input of said GNSS receiver is connected to an output of said GNSS antenna by a wired connection.

* * * * *